(12) United States Patent
Sychaleun et al.

(10) Patent No.: US 8,452,333 B2
(45) Date of Patent: May 28, 2013

(54) FEEDER CABLE REDUCTION

(75) Inventors: Somsack Sychaleun, Kanata (CA); Gregory Carleton, Ottawa (CA); Steve Beaudin, Nepean (CA)

(73) Assignee: Apple Inc., Cupertino, CA (US)

( * ) Notice: Subject to any disclaimer, the term of this patent is extended or adjusted under 35 U.S.C. 154(b) by 2166 days.

(21) Appl. No.: 11/301,047

(22) Filed: Dec. 12, 2005

(65) Prior Publication Data
US 2007/0135169 A1 Jun. 14, 2007

(51) Int. Cl.
*H04M 1/00* (2006.01)

(52) U.S. Cl.
USPC ...... 455/562.1; 455/561; 455/101; 455/575.7

(58) Field of Classification Search
USPC .................................. 455/562.1, 101, 575.7
See application file for complete search history.

(56) References Cited

U.S. PATENT DOCUMENTS

| | | | |
|---|---|---|---|
| 4,768,187 A | 8/1988 | Marshall | |
| 4,839,894 A | 6/1989 | Rudish et al. | |
| 5,216,434 A | 6/1993 | Fukumura | |
| 5,289,505 A | 2/1994 | LaRosa et al. | |
| 5,748,669 A | 5/1998 | Yada | |
| 5,774,193 A | 6/1998 | Vaughan | |
| 5,784,683 A | 7/1998 | Sistanizadeh et al. | |
| 5,818,875 A | 10/1998 | Suzuki et al. | |
| 5,832,389 A | 11/1998 | Dent | |
| 5,883,901 A | 3/1999 | Chiu et al. | |
| 6,011,513 A | 1/2000 | Wilson et al. | |
| 6,088,381 A | 7/2000 | Myers, Jr. | |
| 6,125,109 A | 9/2000 | Fuerter | |
| 6,148,219 A | 11/2000 | Engelbrecht et al. | |
| 6,178,158 B1 | 1/2001 | Suzuki et al. | |
| 6,192,070 B1 | 2/2001 | Poon et al. | |
| 6,252,548 B1 | 6/2001 | Jeon | |
| 6,266,545 B1 | 7/2001 | Backman et al. | |
| 6,462,704 B2 | 10/2002 | Rexberg et al. | |
| 6,522,642 B1 | 2/2003 | Scott | |
| 6,535,732 B1 * | 3/2003 | McIntosh et al. ............. | 455/445 |
| 6,594,508 B1 | 7/2003 | Ketonen | |
| 6,657,978 B1 | 12/2003 | Millman | |
| 6,760,342 B1 | 7/2004 | Skones et al. | |

(Continued)

FOREIGN PATENT DOCUMENTS

| | | |
|---|---|---|
| WO | WO 99/26317 A1 | 5/1999 |
| WO | WO0041339 | 7/2000 |

OTHER PUBLICATIONS

International Search Report for PCT/IB2006/002575 mailed Feb. 8, 2007.

(Continued)

*Primary Examiner* — Kwasi Karikari
(74) *Attorney, Agent, or Firm* — Meyertons, Hood, Kivlin, Kowert & Goetzel, P.C.

(57) ABSTRACT

The present invention facilitates the reduction of cabling required in a base station environment. When receive diversity is employed, main and diversity antennas are used to receive common signals at different locations. The signals received at the main and diversity antennas are combined with one another in the masthead and transmitted over a single feeder cable to a base housing for further processing. Thus, signals that were normally sent over separate feeder cables and combined in the base housing are combined in the masthead and sent over a single feeder cable. The technique can be replicated for each sector provided by the base station environment.

26 Claims, 3 Drawing Sheets

U.S. PATENT DOCUMENTS

| | | | |
|---|---|---|---|
| 6,801,788 B1 | 10/2004 | Csapo et al. | |
| 6,826,163 B2 * | 11/2004 | Mani et al. | 370/334 |
| 6,831,901 B2 * | 12/2004 | Millar | 370/315 |
| 6,963,305 B2 | 11/2005 | Knapp | |
| 6,983,174 B2 | 1/2006 | Hoppenstein et al. | |
| 7,038,621 B2 | 5/2006 | Gabriel et al. | |
| 7,069,051 B1 | 6/2006 | Katz | |
| 7,123,939 B1 | 10/2006 | Bird et al. | |
| 7,181,243 B1 | 2/2007 | Nicholls et al. | |
| 7,424,039 B2 | 9/2008 | Deane et al. | |
| 2001/0044323 A1 | 11/2001 | Waylett | |
| 2002/0132644 A1 | 9/2002 | Mellor et al. | |
| 2002/0196497 A1 | 12/2002 | LoCascio et al. | |
| 2003/0109283 A1 | 6/2003 | Shapira et al. | |
| 2003/0148747 A1 | 8/2003 | Yamamoto | |
| 2004/0190479 A1 * | 9/2004 | Deane et al. | 370/339 |
| 2004/0190480 A1 | 9/2004 | Deane et al. | |
| 2004/0266356 A1 | 12/2004 | Javor et al. | |
| 2005/0215288 A1 | 9/2005 | Beaudin et al. | |
| 2005/0250541 A1 | 11/2005 | Bird et al. | |
| 2006/0003808 A1 | 1/2006 | Haskell et al. | |
| 2006/0067262 A1 * | 3/2006 | Troemel | 370/312 |
| 2006/0252461 A1 * | 11/2006 | Grant et al. | 455/562.1 |

OTHER PUBLICATIONS

Jaffe, J. S. and Mackey, R. C., "Microwave Frequency Translator," article, IEEE Transactions on Microwave Theory and Techniques, May 1965, pp. 371-372.

* cited by examiner

FEEDER CABLE REDUCTION

FIELD OF THE INVENTION

The present invention relates to cellular communications, and in particular to processing radio frequency signals at a base station in a manner reducing the number of antenna feeder cables necessary when receive antenna diversity is employed.

BACKGROUND OF THE INVENTION

In cellular communication environments, the electronics used to facilitate receiving and transmitting signals are distributed between a base housing and a masthead, which is mounted atop a building, tower, or like mast structure. The actual antennas used for transmitting and receiving signals are associated with the masthead. The masthead will generally include basic electronics to couple the antennas to corresponding antenna feeder cables, which connect to transceiver and amplifier electronics located in the base housing.

Historically, the amount of electronics placed in the masthead has been minimized, due to inhospitable environmental conditions, such as lightning, wind, precipitation, and temperature extremes, along with the difficulty in replacing the electronics when failures occur (i.e., physically carrying replacement electronics up the mast structure, which can be in excess of 100 meters (300 ft.) in height). Maintenance of the masthead is time-consuming and dangerous, given the location of the masthead. Minimizing the electronics in the masthead has resulted in essentially each antenna being associated with a separate antenna feeder cable.

As time progressed, the reliability of the electronics has greatly increased. Further, the cost of the electronics has been greatly reduced, whereas the cost of the antenna feeder cables has held relatively constant, if not increased. Thus, a decade ago the antenna feeder cables were an insignificant cost associated with a base station environment. Today, the cost of the antenna feeder cables is a significant portion of the cost associated with the base station environment. Accordingly, there is a need to minimize the number of antenna feeder cables associated with a base station environment, without impacting the functionality or operability of the base station environment. Further, there is a need to minimize the increase in cost associated with the masthead and base housing electronics by minimizing the number of antenna feeder cables required to connect the masthead electronics to the base housing electronics.

SUMMARY OF THE INVENTION

The present invention facilitates the reduction of cabling required in a base station environment. When receive diversity is employed, main and diversity antennas are used to receive common signals at different locations. The signals received at the main and diversity antennas are combined with one another in the masthead and transmitted over a single feeder cable to a base housing for further processing. Thus, signals that were normally sent over separate feeder cables and combined in the base housing are combined in the masthead and sent over a single feeder cable. The technique can be replicated for each sector provided by the base station environment to afford further cost savings and simplification.

In a first embodiment, signals are received at the main and diversity antennas, downconverted to baseband, and combined in the masthead electronics. Once combined, the resultant signals are upconverted in the masthead electronics and transmitted over a single feeder cable to the base housing electronics for further processing. In a second embodiment, the signals are received at main and diversity antennas and combined in the masthead electronics at radio frequencies. Once combined, the resultant signals are transmitted over a single feeder cable to the base housing electronics for further processing.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention facilitates the reduction of cabling required in a base station environment. When receive diversity is employed, main and diversity antennas are used to receive common signals at different locations. The signals received at the main and diversity antennas are combined with one another in the masthead and sent over a single feeder cable to a base station housing for further processing. Signals that were normally sent over separate feeder cables and combined in the base housing are combined in the masthead and sent over a single feeder cable.

Figure 1:
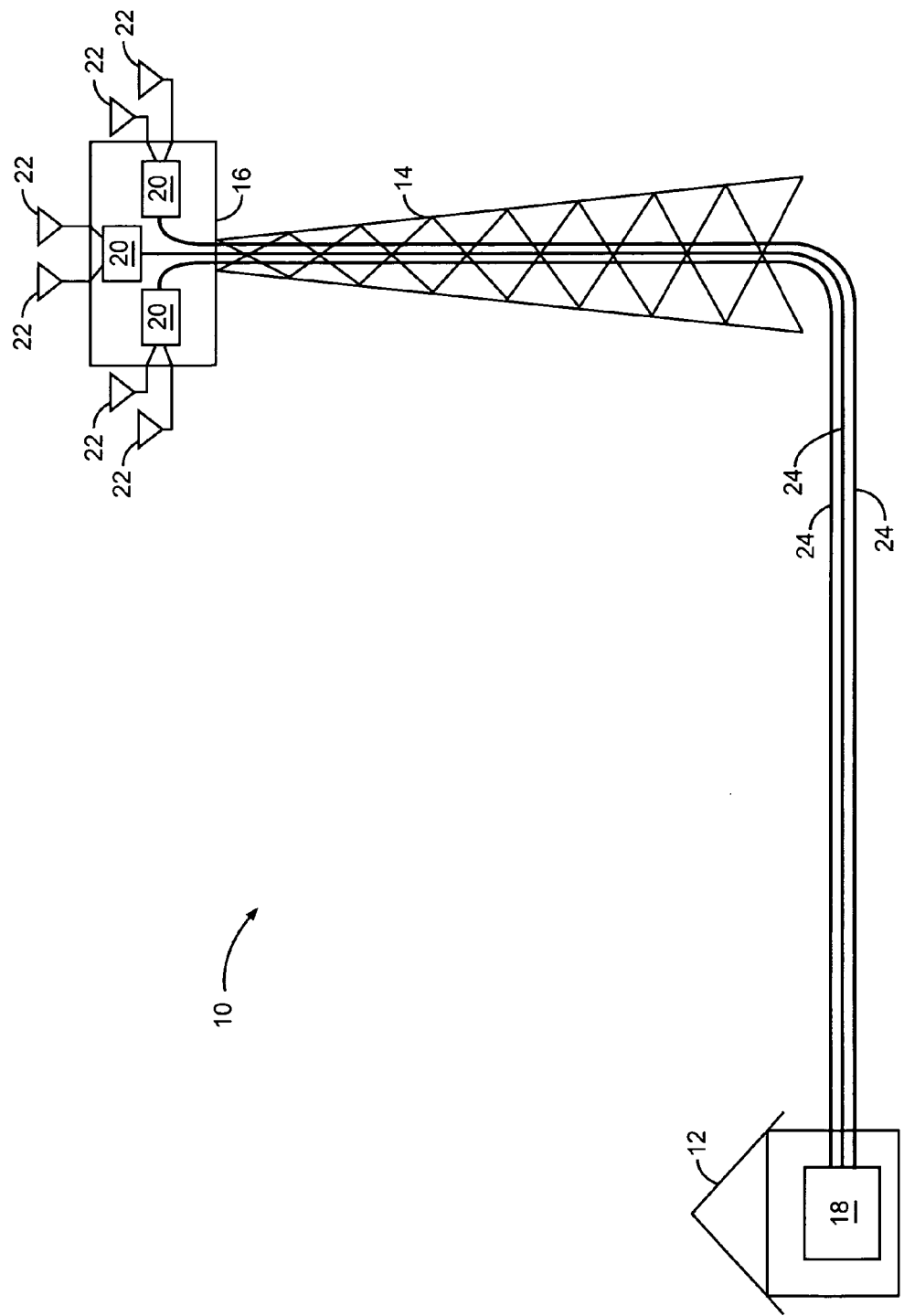
FIG. 1 is a block representation of a base station environment according to one embodiment of the present invention.

Prior to delving into the details of the present invention, an overview of an exemplary base station environment 10 is illustrated in FIG. 1. A base housing 12 is provided in a secure location in association with a mast 14, which may be a tower or other structure near the top of which is mounted a masthead 16. Communications for the base station environment 10 are distributed between the masthead 16 and the base housing 12. In particular, the base housing 12 will include base housing electronics 18, which include the primary transceiver and power amplification circuitry required for cellular communications. The masthead 16 will include masthead electronics 20, which generally comprise the limited amount of electronics necessary to operatively connect with multiple antennas 22, which are mounted on the masthead 16. The masthead electronics 20 and the base housing electronics 18 are coupled together with one or more feeder cables 24.

For the illustrated embodiment, assume the base station environment 10 has three sectors wherein spatial diversity is employed when receiving signals from mobile terminals. Each sector has two spatially separated antennas 22 and one feeder cable 24 connecting the masthead electronics 20 and the base housing electronics 18. Accordingly, there are three feeder cables 24 illustrated in FIG. 1. In a traditional base station environment employing three sectors and receive diversity, six feeder cables 24 would be required, since each antenna 22 would be associated with one feeder cable 24. The present invention eliminates the need to have one feeder cable 24 associated with each antenna 22 in an efficient and cost effective manner.

Figure 2:
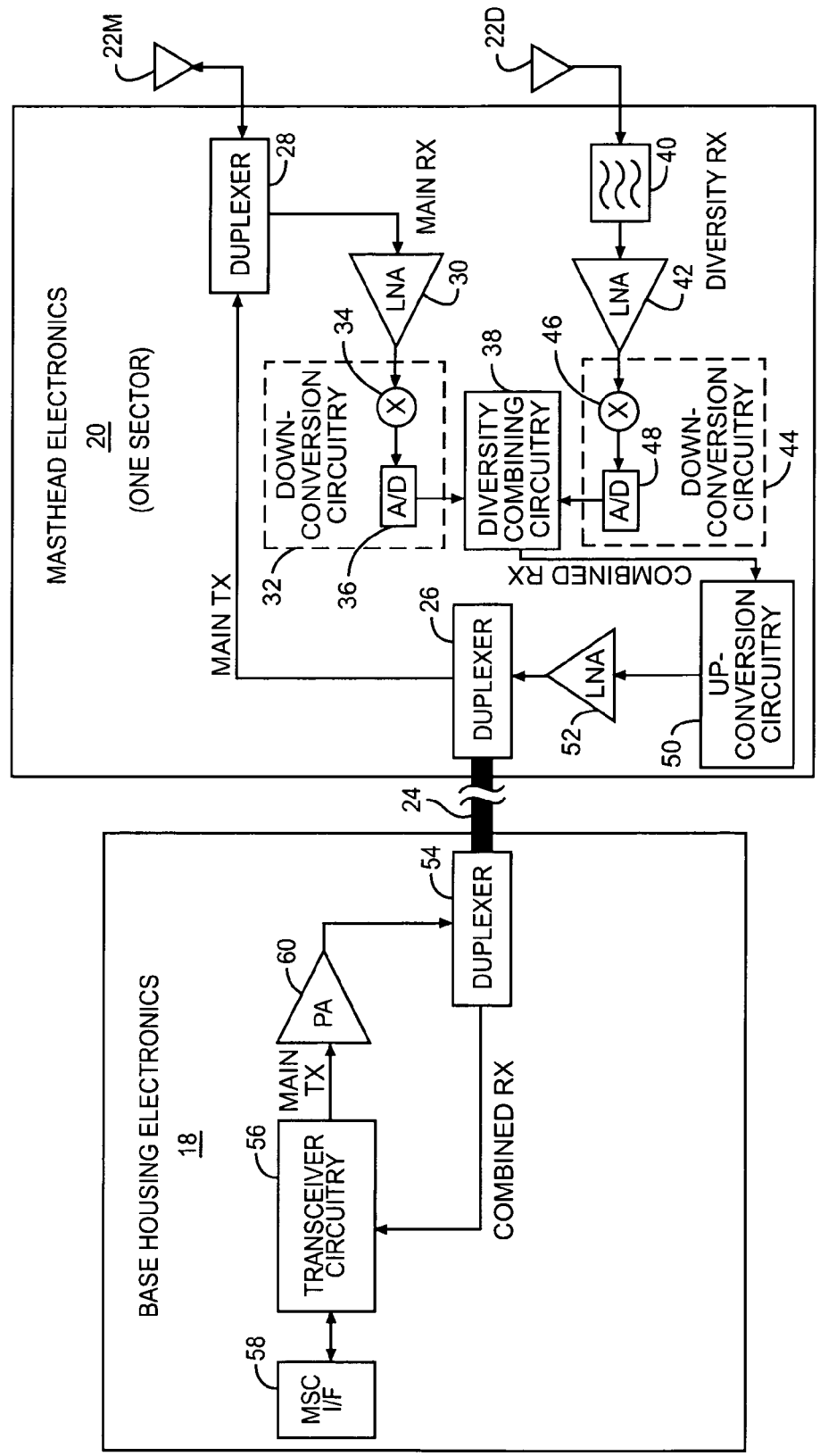
FIG. 2 is a block representation of base housing electronics and masthead electronics according to a first embodiment of the present invention.

Turning now to FIG. 2, a block representation of the base housing electronics 18 and one sector of the masthead electronics 20 is provided according to one embodiment of the present invention. The masthead electronics 20 illustrated will be substantially replicated for each sector, and each sector will require only one feeder cable 24. For each sector, signals are received at different antennas 22, downconverted to baseband, and combined in the masthead electronics 20. Once combined, the resultant signals are upconverted in the masthead electronics 20 and sent over the feeder cable 24 to the base housing electronics 18 for further processing. This embodiment is particularly beneficial in cellular environments using digital-based modulation techniques, such as cellular environments employing Code Division Multiple Access (CDMA) in a 3GPP or 3GPP2-compliant manner.

As illustrated, there are two antennas 22 for a given sector. A first antenna is referred to as a main antenna 22M, and the second antenna is referred to as a diversity antenna 22D. When transmitting from the main antenna 22M, signals to be transmitted are provided from the base housing electronics 18 over the feeder cable 24 to a duplexer 26 in the masthead electronics 20. The signals to be transmitted (MAIN TX) are sent to another duplexer 28 and transmitted via the main antenna 22M.

For receiving, signals transmitted from remote devices will be received at both the main antenna 22M and the diversity antenna 22D. The signals received at the main antenna 22M are referred to as the main receive signals (MAIN RX), and the signals received at the diversity antenna 22D are referred to as the diversity receive signals (DIVERSITY RX). In operation, the main receive signal received at the main antenna 22M is routed by the duplexer 28 to a low noise amplifier (LNA) 30, which will amplify the main receive signal and present it to downconversion circuitry 32. The downconversion circuitry 32 may include mixing circuitry 34 for converting the main receive signals from RF signals to baseband signals. The baseband signals are digitized by an analog-to-digital converter (A/D) 36 and presented to diversity combining circuitry 38.

Similarly, the diversity receive signal received at the diversity antenna 22D is passed to a band-pass filter 40 and then to a low noise amplifier 42, which will amplify the diversity receive signal and present it to downconversion circuitry 44. The downconversion circuitry 44 may include mixing circuitry 46 for converting the diversity receive signals from RF signals to baseband signals. The baseband signals are digitized by an analog-to-digital converter 48 and presented to the diversity combining circuitry 38.

The diversity combining circuitry 38 effectively combines the baseband main and diversity receive signals to arrive at estimated receive signals, which are hereinafter referred to as combined receive signals (COMBINED RX) for clarity. The diversity combining circuitry 38 may implement optimal combining or any diversity combining technique, which uses the main and diversity receive signals to determine combined receive signals representing the signals originally transmitted from the remote devices.

The combined received signals are upconverted from baseband signals to modulated RF signals by the upconversion circuitry 50, amplified by a low noise amplifier 52, and presented to the duplexer 26. The duplexer 26 functions to direct the modulated, combined received signals through the feeder cable 24 to the base housing electronics 18.

At the base housing electronics 18, the combined receive signal is received by a duplexer 54 and provided to the transceiver circuitry 56. The transceiver circuitry 56 will downconvert the combined receive signals to baseband signals, process the baseband signals in traditional fashion, and forward the resultant signals to a mobile switching center (MSC) or other device via an MSC interface 58 for transmission to an appropriate network.

When transmitting, the base housing electronics 18 will generate a main transmit signal (MAIN TX) using the transceiver circuitry 56 and provide the main transmit signal to a power amplifier (PA) 60. The amplified main transmit signal will then be provided to the duplexer 54, which will send the amplifier main transmit signal over the feeder cable 24 toward the masthead electronics 20. As noted above, the duplexer 26 will route the main transmit signal to the main antenna 22M via duplexer 28.

Figure 3:
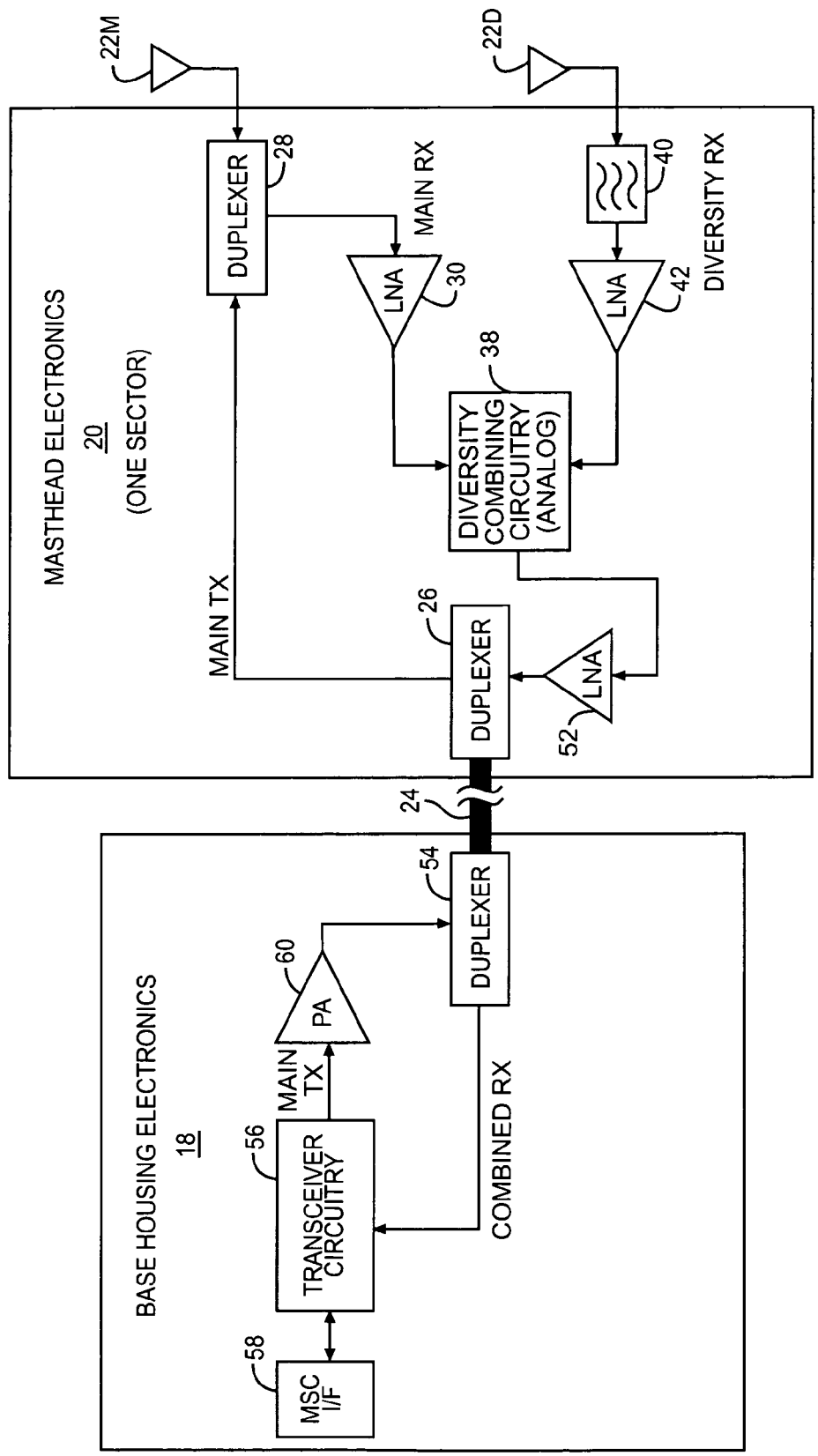
FIG. 3 is a block representation of base housing electronics and masthead electronics according to a second embodiment of the present invention.

Turning now to FIG. 3, a block representation of the base housing electronics 18 and one sector of the masthead electronics 20 is provided according to another embodiment of the present invention. For each sector, the signals are received at different antennas 22 and combined in the masthead electronics 20. Once combined, the resultant signals are sent over the feeder cable 24 to the base housing electronics 18 for further processing. Unlike the prior embodiment, the received signals from the different antennas 22 are combined at radio frequencies and then sent over the feeder cable 24 to the base housing electronics 18, instead of being downconverted, combined at baseband, and upconverted for transmission over the feeder cable 24. This embodiment is particularly beneficial in cellular environments using analog-based modulation techniques, such as cellular environments employing Time Division Multiple Access (TDMA).

In particular, there are two antennas 22 illustrated. Again, the first antenna is referred to as the main antenna 22M, and the second antenna is referred to as the diversity antenna 22D. When transmitting from the main antenna 22M, signals to be transmitted will be provided from the base housing electronics 18 over the feeder cable 24 to a duplexer 26 in the masthead electronics 20. The signals to be transmitted (MAIN TX) are sent to another duplexer 28 and transmitted via the main antenna 22M.

For receiving, signals transmitted from remote devices will be received at both the main antenna 22M and the diversity antenna 22D. The signals received at the main antenna 22M are again referred to as the main receive signals (MAIN RX), and the signals received at the diversity antenna 22D are referred to as the diversity receive signals (DIVERSITY RX). In operation, the main receive signal received at the main antenna 22M is routed by the duplexer 28 to the low noise amplifier 30, which will amplify the main receive signal and present these radio frequency signals substantially directly to diversity combining circuitry 38.

The diversity receive signal received at the diversity antenna 22D is passed through a band-pass filter 40 to a low noise amplifier 42, which will amplify the diversity receive signal and present these radio frequency signals substantially directly to the diversity combining circuitry 38. For this embodiment, the diversity combining circuitry 38 operates to combine modulated radio frequency signals instead of combining baseband signals to generate corresponding combined receive signals. The diversity combining circuitry 38 may implement any radio frequency diversity combining technique, which combines the main and diversity received signals at radio frequencies to generate combined receive signals representing the signals originally transmitted from the remote devices. The combined receive signals are amplified by a low noise amplifier 52 and presented to the duplexer 26. The duplexer 26 functions to direct combined receive signals through the feeder cable 24 to the base housing electronics 18.

At the base housing electronics 18, the combined receive signal is received by a duplexer 54 and provided to transceiver circuitry 56. The transceiver circuitry 56 will downconvert the combined receive signals to baseband signals, process the baseband signals in traditional fashion, and forward the resultant signals to a mobile switching center or other device via an MSC interface 58 for transmission over the appropriate network.

For transmitted signals, the base housing electronics 18 will generate the main transmit signal (MAIN TX) using the transceiver circuitry 56 and provide the main transmit signal to a power amplifier 60. The amplified main transmit signal will then be provided to the duplexer 54, which will send the amplifier main transmit signal over the feeder cable 24 toward the masthead electronics 20. Again, the duplexer 26 will route the main transmit signal to the main antenna 22M via duplexer 28.

Those skilled in the art will recognize improvements and modifications to the preferred embodiments of the present invention. All such improvements and modifications are considered within the scope of the concepts disclosed herein and the claims that follow.

What is claimed is:

1. A method for receiving signals via masthead electronics and providing the signals to base housing electronics in a base station environment, the method comprising:
   receiving first receive signals in the masthead electronics from a first antenna;
   receiving second receive signals in the masthead electronics from a second antenna; and
   combining the first receive signals and the second receive signals in the masthead electronics to form combined receive signals, which are sent to the base housing electronics over a single feeder cable.

2. The method of claim 1 wherein the first and second antennas are spatially diverse and the first and second receive signals are signals transmitted from a remote device and received at both of the first and second antennas.

3. The method of claim 1 wherein the first and second receive signals are received as radio frequency signals.

4. The method of claim 3 wherein the first and second receive signals are combined at radio frequencies to form the combined receive signals at radio frequencies.

5. The method of claim 3 wherein the first and second receive signals are combined at baseband to form the combined receive signals at baseband, the method further comprising:
   downconverting the first receive signals to baseband;
   downconverting the second receive signals to baseband; and
   upconverting the combined receive signals from baseband to radio frequencies prior to being sent to the base housing electronics over the single feeder cable.

6. The method of claim 4 wherein the radio frequencies of the first and second receive signals correspond to the radio frequencies of the combined receive signals.

7. The method of claim 1 further comprising sending the combined receive signals over the single feeder cable to the base housing electronics.

8. The method of claim 1 wherein the first and second receive signals are combined using diversity combining techniques to form the combined receive signals.

9. The method of claim 1 wherein the second antenna is a main antenna also used to transmit signals, and the first antenna is a diversity antenna associated with the second antenna, the method further comprising:
   receiving transmit signals from the base housing electronics via the single feeder cable; and
   transmitting the transmit signals via the main antenna.

10. The method of claim 1 further comprising:
    receiving the combined receive signals via the single feeder cable at the base housing electronics; and
    downconverting the combined receive signals to retrieve information signals.

11. The method of claim 1 wherein the first and second receive signals correspond to a cellular signal transmitted from a cellular communication device.

12. The method of claim 1 wherein the first and second antennas are associated with one of a plurality of sectors for the base station environment.

13. The method of claim 12 wherein each sector uses one feeder cable between the masthead electronics and the base housing electronics.

14. Base station electronics for receiving signals via masthead electronics and providing the signals to base housing electronics in a base station environment, the base station electronics comprising in the masthead:
    a first input adapted to receive first receive signals from a first antenna;
    a second input adapted to receive a second receive signals from a second antenna; and
    combining circuitry adapted to combine the first receive signals and the second receive signals to form combined receive signals, which are sent to the base housing electronics over a single feeder cable.

15. The base station electronics of claim 14 wherein the first and second antennas are spatially diverse, and the first and second receive signals are signals transmitted from a remote device and received at both of the first and second antennas.

16. The base station electronics of claim 14 wherein the first and second receive signals are received as radio frequency signals.

17. The base station electronics of claim 16 wherein the first and second receive signals are combined at radio frequencies to form the combined receive signals at radio frequencies.

18. The base station electronics of claim 16 wherein the first and second receive signals are combined at baseband to form the combined receive signals at baseband, the masthead electronics further comprising:
    first downconversion circuitry adapted to downconvert the first receive signals to baseband;
    second downconversion circuitry adapted to downconvert the second receive signals to baseband; and
    upconversion circuitry adapted to upconvert the combined receive signals from baseband to radio frequencies prior to being sent to the base housing electronics over the single feeder cable.

19. The base station electronics of claim 17 wherein the radio frequencies of the first and second receive signals correspond to the radio frequencies of the combined receive signals.

20. The base station electronics of claim 14 further comprising coupling circuitry adapted to send the combined receive signals over the single feeder cable to the base housing electronics.

21. The base station electronics of claim 14 wherein the first and second receive signals are combined using diversity combining techniques to form the combined receive signals.

22. The base station electronics of claim 14 wherein the second antenna is a main antenna also used to transmit signals and the first antenna is a diversity antenna associated with the second antenna, and further comprising coupling circuitry adapted to receive transmit signals from the base housing electronics via the single feeder cable and send the transmit signals to the main antenna for transmission.

23. The base station electronics of claim 14 wherein the base housing electronics comprise downconversion circuitry adapted to downconvert the combined receive signals received via the single feeder cable to retrieve information signals.

24. The base station electronics of claim 14 wherein the first and second receive signals correspond to a cellular signal transmitted from a cellular communication device.

25. The base station electronics of claim 14 wherein the first and second antennas are associated with one of a plurality of sectors for the base station environment.

26. The base station electronics of claim 25 wherein each sector uses one feeder cable between the masthead electronics and the base housing electronics.

* * * * *